US010721560B2

(12) United States Patent
Alders et al.

(10) Patent No.: US 10,721,560 B2
(45) Date of Patent: *Jul. 21, 2020

(54) INTELLIGENT BEAM STEERING IN MICROPHONE ARRAY

(71) Applicant: Bose Corporation, Framingham, MA (US)

(72) Inventors: Jamie Michael Alders, Dover, MA (US); Elio Dante Querze, III, Arlington, MA (US)

(73) Assignee: BOSE COPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,361

(22) Filed: Nov. 21, 2019

(65) Prior Publication Data

US 2020/0092644 A1   Mar. 19, 2020

Related U.S. Application Data

(63) Continuation of application No. 15/952,920, filed on Apr. 13, 2018, now Pat. No. 10,524,048.

(51) Int. Cl.
*H04R 3/00* (2006.01)
*H04R 1/40* (2006.01)
(Continued)

(52) U.S. Cl.
CPC .......... *H04R 3/005* (2013.01); *G10L 21/0232* (2013.01); *G10L 21/0316* (2013.01);
(Continued)

(58) Field of Classification Search
CPC ..... H04R 3/005; H04R 1/406; G10L 21/0232; G10L 21/0316; G10L 15/22; G10L 2015/223
See application file for complete search history.

(56) References Cited

U.S. PATENT DOCUMENTS 5,335,011 A   8/1994   Addeo et al.
7,720,212 B1   5/2010   Jouppi et al.
(Continued)

OTHER PUBLICATIONS

PCT Invitation to Pay Additional Fees, and Where Applicable, Protest Fee for PCT Application No. PCT/US2019/026896, dated Jul. 17, 2019, 11 pages.

*Primary Examiner* — Mohammad K Islam
(74) *Attorney, Agent, or Firm* — Hoffman Warnick LLC

(57) ABSTRACT

Various aspects include approaches for intelligent acoustic beam steering. In particular aspects, a computer-implemented method of controlling a microphone array includes: generating an acoustic map including an acoustic description of a physical environment proximate the speaker system; focusing the microphone array in a direction based upon the acoustic map prior to receiving a voice command input at the microphone array, where generating the acoustic map includes: detecting a location of at least one noise source in the physical environment; and creating a microphone array filter configured to at least partially reject the at least one noise source; receiving voice feedback input from a user at the microphone array; and updating the acoustic map of the physical environment based upon the received voice feedback input.

20 Claims, 5 Drawing Sheets

(51) Int. Cl.
  *G10L 21/0232* (2013.01)
  *G10L 21/0316* (2013.01)
  *G10L 15/22* (2006.01)

(52) U.S. Cl.
  CPC .............. *H04R 1/406* (2013.01); *G10L 15/22* (2013.01); *G10L 2015/223* (2013.01)

(56) References Cited

U.S. PATENT DOCUMENTS

| | | | |
|---|---|---|---|
| 8,831,936 | B2 | 9/2014 | Toman et al. |
| 8,885,815 | B1 * | 11/2014 | Velusamy ................ H04R 3/02 379/406.03 |
| 9,532,131 | B2 * | 12/2016 | Dusan .................. H04R 1/1083 |
| 9,866,308 | B1 | 1/2018 | Bultan et al. |
| 10,074,356 | B1 | 9/2018 | Sarkar et al. |
| 10,249,299 | B1 * | 4/2019 | Hart ........................ G10L 15/20 |
| 2002/0067835 | A1 * | 6/2002 | Vatter ...................... G01H 7/00 381/58 |
| 2004/0013038 | A1 * | 1/2004 | Kajala .................... G01S 3/043 367/119 |
| 2004/0037436 | A1 | 2/2004 | Rui |
| 2006/0256974 | A1 | 11/2006 | Oxford |
| 2007/0093714 | A1 * | 4/2007 | Beaucoup ............. H04M 9/085 600/437 |
| 2009/0052688 | A1 | 2/2009 | Ishibashi et al. |
| 2010/0150364 | A1 * | 6/2010 | Buck ....................... G01S 3/807 381/66 |
| 2012/0120218 | A1 | 5/2012 | Flaks et al. |
| 2012/0294118 | A1 | 11/2012 | Haulick et al. |
| 2014/0314251 | A1 * | 10/2014 | Rosca .................... H04R 3/005 381/92 |
| 2014/0376741 | A1 * | 12/2014 | Kechichian ........... G01S 3/8083 381/92 |
| 2015/0050967 | A1 | 2/2015 | Bao et al. |
| 2015/0256928 | A1 * | 9/2015 | Mizuno .................. G01S 15/08 381/56 |
| 2015/0364137 | A1 | 12/2015 | Katuri et al. |
| 2016/0071526 | A1 * | 3/2016 | Wingate ................ G10L 21/028 704/233 |
| 2016/0148417 | A1 | 5/2016 | Kim et al. |
| 2016/0164577 | A1 | 6/2016 | Rexroad et al. |
| 2016/0261953 | A1 * | 9/2016 | Aggarwal ................ H03G 3/20 |
| 2016/0300584 | A1 | 10/2016 | Pandey et al. |
| 2017/0127017 | A1 | 5/2017 | Takahashi et al. |
| 2017/0134853 | A1 * | 5/2017 | Beaty .................. H04R 29/005 |
| 2017/0243576 | A1 | 8/2017 | Millington et al. |
| 2017/0353789 | A1 * | 12/2017 | Kim ...................... H04R 3/005 |
| 2018/0033447 | A1 * | 2/2018 | Ramprashad ......... G10L 21/028 |
| 2018/0088900 | A1 | 3/2018 | Glaser |
| 2018/0115855 | A1 * | 4/2018 | Bakish .................. H04R 1/406 |
| 2018/0167515 | A1 | 6/2018 | Shi et al. |
| 2018/0240471 | A1 | 8/2018 | Markovich Golan et al. |
| 2018/0253276 | A1 * | 9/2018 | Kodama ................. H04R 3/04 |
| 2018/0277113 | A1 | 9/2018 | Hartung et al. |
| 2018/0330745 | A1 * | 11/2018 | Ebenezer ............ G10L 21/0208 |
| 2019/0096408 | A1 * | 3/2019 | Li ........................... G10L 17/06 |

\* cited by examiner

INTELLIGENT BEAM STEERING IN MICROPHONE ARRAY

PRIORITY CLAIM

This application is a continuation application of U.S. patent application Ser. No. 15/952,920, filed on Apr. 13, 2018, which is hereby incorporated by reference in its entirety.

TECHNICAL FIELD

This disclosure generally relates to acoustic beam steering. More particularly, the disclosure relates to controlling beam direction in a microphone array based upon an acoustic map of a physical environment.

BACKGROUND

Directionality in acoustic signals can greatly affect the user experience. In dynamic systems, such as portable acoustic systems, users and/or noise-generating devices change position relative to the acoustic system as the acoustic system moves within a physical environment. Additionally, where an acoustic system remains in a stationary position, such as in a home, office or other environment, the position of users and/or noise-generating devices can change relative to that acoustic system. Systems that fail to adapt to their surrounding environment may deliver an undesirable user experience.

SUMMARY

All examples and features mentioned below can be combined in any technically possible way.

Various implementations of the disclosure include approaches for intelligent acoustic beam steering. In some implementations, a method of controlling a microphone array in a speaker system is disclosed. In other implementations, a speaker system is disclosed.

In some particular aspects, a computer-implemented method of controlling a microphone array includes: generating an acoustic map including an acoustic description of a physical environment proximate the speaker system; and focusing the microphone array in a direction based upon the acoustic map prior to receiving a voice command input at the microphone array.

In other particular aspects, a speaker system includes: a microphone array; and a control system connected with the microphone array, the control system programmed to: generate an acoustic map including an acoustic description of a physical environment proximate the speaker system; and focus the microphone array in a direction based upon the acoustic map prior to receiving a voice command input at the microphone array.

In additional particular aspects, a computer-implemented method of controlling a microphone array includes: generating an acoustic map including an acoustic description of a physical environment proximate the speaker system; focusing the microphone array in a direction based upon the acoustic map prior to receiving a voice command input at the microphone array, where generating the acoustic map includes: detecting a location of at least one noise source in the physical environment; and creating a microphone array filter configured to at least partially reject the at least one noise source; receiving voice feedback input from a user at the microphone array; and updating the acoustic map of the physical environment based upon the received voice feedback input.

In further particular aspects, a speaker system includes: a microphone array; and a control system connected with the microphone array, the control system programmed to: generate an acoustic map comprising an acoustic description of a physical environment proximate the speaker system, wherein generating the acoustic map comprises: receiving a set of acoustic signals from the physical environment at the microphone array; identifying at least one noise source from the set of received acoustic signals; creating a microphone array filter configured to at least partially reject the at least one noise source, wherein creating the set of microphone array filters comprises categorizing the set of received acoustic signals according to at least one of frequency or amplitude, and correlating control instructions for modifying a gain on the microphone array with the categorized set of received acoustic signals; and storing the microphone array filter in a library of microphone array filters; and focus the microphone array in a direction based upon the acoustic map prior to receiving a voice command input at the microphone array.

In other particular aspects, a computer-implemented method of controlling a microphone array in a portable speaker system includes: generating an acoustic map comprising an acoustic description of a physical environment proximate the speaker system; and focusing the microphone array in a direction based upon the acoustic map prior to receiving a voice command input at the microphone array; wherein generating the acoustic map comprises: detecting a location of at least one noise source in the physical environment; and creating a microphone array filter configured to at least partially reject the at least one noise source; detecting movement of the speaker system from a first physical location to a second physical location; generating an updated acoustic map comprising an acoustic description of a physical environment proximate the speaker system at the second physical location; and focusing the microphone array in an updated direction based upon the updated acoustic map prior to receiving a subsequent voice command input at the microphone array.

In certain aspects, generating the acoustic map includes at least one of an initial mapping period, an advanced mapping period, or a continuing mapping period. In particular cases, the initial mapping period includes: sending a set of test acoustic signals into the physical environment from a transducer in the speaker system; receiving a set of return acoustic signals from the physical environment at the microphone array; and characterizing at least one zone in the physical environment based upon a difference between the set of test acoustic signals and the set of return acoustic signals. In some implementations, the advanced mapping period includes: receiving a set of acoustic signals from the physical environment at the microphone array over a period; and characterizing at least one additional zone in the physical environment or re-characterizing the at least one zone in the physical environment, based upon the set of acoustic signals received over the period. In certain cases, the continuing mapping period includes: continually receiving a set of acoustic signals from the physical environment at the microphone array; and re-characterizing the at least one additional zone or the at least one zone in the physical environment based upon the set of acoustic signals continually received during the continuing mapping period.

In certain implementations, the advanced mapping period is initiated after the initial mapping period. In some cases, the continuing mapping period is initiated after the advanced mapping period.

In particular implementations, generating the acoustic map includes: at least one of detecting a location of at least one noise source in the physical environment or detecting a frequent voice-command location in the physical environment; and creating a microphone array filter configured to at least partially reject the at least one noise source or enhance detection of the voice command input from the frequent voice-command location.

In some aspects, the computer-implemented method further includes: receiving user-entered identification information about the speaker system; and updating the acoustic map of the physical environment based upon the user-entered identification information.

In particular implementations, the speaker system includes a portable speaker system, and the computer-implemented method further includes: detecting movement of the speaker system from a first physical location to a second physical location; generating an updated acoustic map including an acoustic description of a physical environment proximate the speaker system at the second physical location; and focusing the microphone array in an updated direction based upon the updated acoustic map prior to receiving a subsequent voice command input at the microphone array. In certain cases, the microphone array remains focused in the direction based upon the acoustic map while the updated acoustic map is being generated. In some aspects, detecting movement of the speaker system from the first physical location to the second physical location includes detecting movement of the speaker system over a period by greater than a movement threshold, the movement threshold measured by a change in at least one of: a location of a power source for the speaker system, an orientation of the speaker system, a position of the speaker system, a proximity to at least one communication network, or a proximity to at least one other connected electronic device.

In certain implementations, the computer-implemented method further includes: prompting a user for a voice feedback input about the acoustic map; receiving the voice feedback input from the user at the microphone array; and updating the acoustic map of the physical environment based upon the received voice feedback input.

In particular cases, the speaker system further includes a transducer connected with the control system, and the initial mapping period includes: sending a set of test acoustic signals into the physical environment from the transducer; receiving a set of return acoustic signals from the physical environment at the microphone array; and characterizing at least one zone in the physical environment based upon a difference between the set of test acoustic signals and the set of return acoustic signals. In certain aspects, the advanced mapping period includes: receiving a set of acoustic signals from the physical environment at the microphone array over a period; and characterizing at least one additional zone in the physical environment or re-characterizing the at least one zone in the physical environment, based upon the set of acoustic signals received over the period. In some implementations, the continuing mapping period includes: continually receiving a set of acoustic signals from the physical environment at the microphone array; and re-characterizing the at least one additional zone or the at least one zone in the physical environment based upon the set of acoustic signals continually received during the continuing mapping period.

In certain cases, generating the acoustic map includes: at least one of detecting a location of at least one noise source in the physical environment or detecting a frequent voice-command location in the physical environment; and creating a microphone array filter configured to at least partially reject the at least one noise source or enhance detection of the voice command input from the frequent voice-command location.

In particular implementations, the control system is further configured to: receive user-entered identification information about the speaker system; and update the acoustic map of the physical environment based upon the user-entered identification information.

In certain cases, the speaker system includes a portable speaker system, and the control system is further configured to: detect movement of the speaker system from a first physical location to a second physical location; generate an updated acoustic map including an acoustic description of a physical environment proximate the speaker system at the second physical location; and focus the microphone array in an updated direction based upon the updated acoustic map prior to receiving a subsequent voice command input at the microphone array. In some aspects, the microphone array remains focused in the direction based upon the acoustic map while the updated acoustic map is being generated. In particular implementations, detecting movement of the speaker system from the first physical location to the second physical location includes detecting movement of the speaker system over a period by greater than a movement threshold, the movement threshold measured by a change in at least one of: a location of a power source for the speaker system, an orientation of the speaker system, a position of the speaker system, a proximity to at least one communication network, or a proximity to at least one other connected electronic device.

In certain aspects, the control system is further configured to: prompt a user for a voice feedback input about the acoustic map; receive the voice feedback input from the user at the microphone array; and update the acoustic map of the physical environment based upon the received voice feedback input.

In particular cases, the speaker system further includes a transducer connected with the control system, where the transducer and the microphone array are located in physically separate housings within the acoustic environment.

In some implementations, the control system includes a digital signal processor for modifying the focus direction of the microphone array based upon the acoustic map.

In certain aspects, generating the acoustic map includes: receiving a set of acoustic signals from the physical environment at the microphone array; identifying at least one noise source from the set of received acoustic signals; creating a microphone array filter configured to at least partially reject the at least one noise source; and storing the microphone array filter in a library of microphone array filters. In particular cases, creating the set of microphone array filters includes categorizing the set of received acoustic signals according to at least one of frequency or amplitude, and correlating control instructions for modifying a gain on the microphone array with the categorized set of received acoustic signals. In certain implementations, the control system modifies the direction of the microphone array according to the stored microphone filter in response to detecting the acoustic signals from the identified at least one noise source. In particular cases, the library of microphone array filters includes a relational database having relationships between the microphone array filter and the acoustic signals from the identified at least one noise source, where the control system is configured to apply the microphone array filter while receiving the voice command input at the microphone array, where applying the microphone array filter includes: receiving an acoustic noise signal at the microphone array; comparing the acoustic noise signal with the acoustic signals from the identified at least one noise source in the library of microphone array filters; and modifying a gain on the microphone array in response to the acoustic noise signal matching the acoustic signals from the identified at least one noise source.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
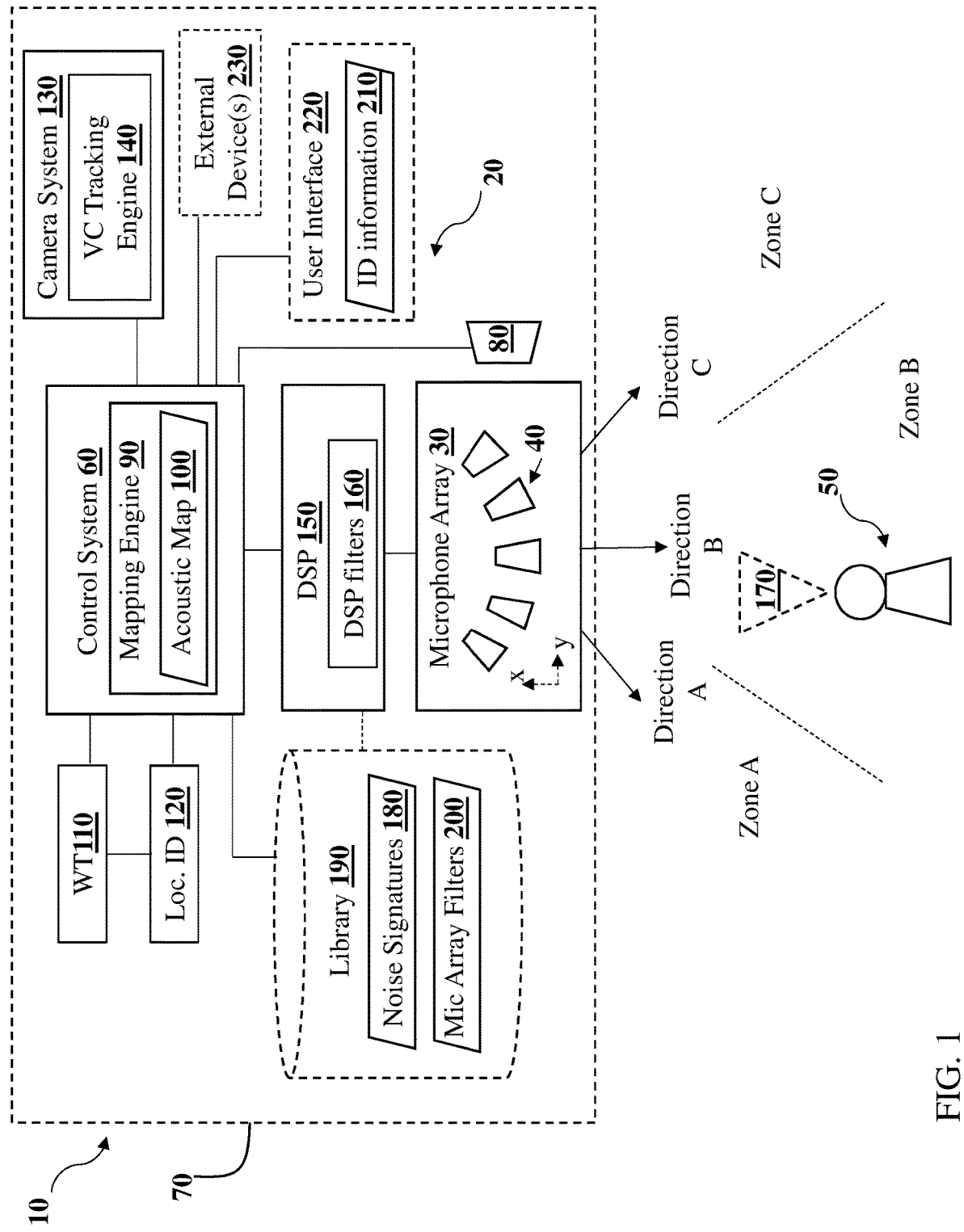
FIG. 1 shows a schematic depiction of an environment illustrating a microphone array control system according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to acoustic beam steering. More particularly, aspects of the disclosure relate to controlling beam direction in a microphone array based upon an acoustic map of a physical environment.

Commonly labeled components in the FIGURES are considered to be substantially equivalent components for the purposes of illustration, and redundant discussion of those components is omitted for clarity.

Aspects and implementations disclosed herein may be applicable to a wide variety of speaker systems, such as personal audio devices, speakers (e.g., a stationary or portable speaker system), headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses or other head-mounted audio devices. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to speaker systems that either do or do not support two-way communications, and either do or do not support active noise reduction (ANR). For speaker systems that do support either two-way communications or ANR, it is intended that what is disclosed and claimed herein is applicable to a speaker system incorporating one or more microphones disposed on a portion of the speaker system that remains outside an ear when in use (e.g., feedforward microphones), on a portion that is inserted into a portion of an ear when in use (e.g., feedback microphones), or disposed on both of such portions. Still other implementations of speaker systems to which what is disclosed and what is claimed herein is applicable will be apparent to those skilled in the art.

Various particular implementations of the disclosure include speaker systems and methods for controlling such systems to provide intelligent beamforming based upon an acoustic map of a physical environment. In conventional speaker systems having a microphone array for receiving an acoustic input, such as virtual personal assistant systems (VPAs), voice user interface systems (VUIs), smart speaker systems, soundbar systems, conferencing systems, wearable audio devices, etc., a control system dictates the direction of the beam formed by its microphone array (or, "microphone array beam," or simply, "beam") based upon an orientation of the speaker system or an audio input. For example, some conventional speaker systems direct their microphone array in a direction based upon the shape or desired orientation of the speaker system (e.g., housing). In these cases, the location of a power cord, auxiliary connections, or a speaker grille may enhance the likelihood that the speaker system will be oriented in a particular manner within an environment (e.g., grille facing toward users). In other examples, a speaker system may be configured in a default microphone array direction that is modifiable based upon the direction of an acoustic input received at that microphone array. In these cases, a default microphone direction is set (e.g., directly outward from the center of the speaker grille), and when an acoustic input (e.g., a voice command) is received, the control system modifies the microphone array direction to "point" toward the source of the acoustic input (e.g., a user). That is, the microphone array can detect voice directionality, e.g., that a user is speaking in a particular portion of the room, and the control system can use digital signal processing (DSP) to modify the direction of the beam in order to enhance the signal to noise ratio of the audio signal from that user.

However, these conventional systems fail to capture quality acoustic inputs (e.g., voice commands) in many circumstances. For example, these conventional speaker systems fail to capture quality acoustic inputs in noisy environments, when a user is located at a significant distance from the speaker, and/or when the speaker is outputting acoustic signals at a high volume (e.g., playing music loudly). These systems can struggle to accurately capture voice commands or parse commands and/or other audio signals through noise.

In contrast to these conventional systems and approaches, various implementations of the disclosure include speaker systems and related methods for controlling microphone array directionality by mapping a local acoustic environment around the speaker system. In some implementations, a speaker system (e.g., a stationary speaker system such as a home audio system, soundbar, automobile audio system, or audio conferencing system, or a portable speaker system such as a smart speaker, wearable audio device or hand-held speaker system) is disclosed. This speaker system is configured to generate an acoustic map including an acoustic description of a physical environment proximate the speaker system, and focus the microphone array in a direction based upon that acoustic map. The speaker system can be configured to pre-focus the microphone, that is, focus the microphone in a direction prior to receiving a voice command input at its microphone array. In certain implementations, the speaker system is movable to a distinct physical location. For example, the speaker system can detect its movement from the first physical location to a distinct physical location, update the acoustic map based upon the acoustic description of the distinct physical environment, and pre-focus the microphone array in an updated direction based upon that updated map.

FIG. 1 shows an illustrative physical environment 10 including a speaker system 20 according to various implementations. As shown, the speaker system 20 can include a microphone array 30 having a plurality of microphones 40 for receiving acoustic signals, such as voice commands from one or more users (one example user 50 shown). The microphone array 30 can be connected with a control system 60 programmed to control the beam direction of the microphone array 30 based upon one or more conditions, as discussed herein.

It is understood that any component described as connected or coupled to another component in speaker system 20 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in speaker system 20 are configured to communicate using one or more conventional wireless transceivers.

As noted herein, control system 60 can include conventional hardware and/or software components for executing program instructions or code according to processes described herein. For example, control system 60 may include one or more processors, memory, communications pathways between components, and/or one or more logic engines for executing program code. Control system 60 can be coupled with microphone array 30 via any conventional wireless and/or hardwired connection which allows control system 60 to send/receive signals to/from microphone array 30 and control operation thereof. In various implementations, control system 60 and microphone array 30 are collectively housed in a speaker housing 70 (shown optionally in phantom), which may include a transducer (speaker) 80 for transmitting acoustic signals (acoustic output) to user(s) 50. However, as described herein, control system 60, microphone array 30 and/or transducer 80 may be separately housed in a speaker system (e.g., speaker system 20) that is connected by any communications protocol (e.g., a wireless communications protocol described herein) and/or via a hard-wired connection.

Control system 60 can include a mapping engine 90 for generating an acoustic map 100 including an acoustic description of the physical environment (e.g., environment 10) proximate the speaker system 20. According to various implementations, mapping engine 90 is configured to process acoustic signals from the environment 10, user-entered identification information about the speaker system 20, voice feedback input from user(s) 50 and/or location information about the speaker system 20 (including movement indicators) in order to generate an acoustic map 100 (e.g., a data file or data structure) describing acoustic properties of the environment 10 relative to the speaker system 20. That is, the mapping engine 90 can include logic for processing data about one or more acoustic signals from the environment 10, user-entered identification information about the speaker system 20, voice feedback input from user(s) 50 and/or location information about the speaker system 20 (including movement indicators) in order to generate the acoustic map 100.

Speaker system 20 can additionally include a wireless transceiver (WT) 110 configured to communicate with one or more components in speaker system 20 and/or other electronic devices connected via one or more wireless networks (e.g., a local WiFi network, Bluetooth connection, or radio frequency (RF) connection). WT 110 may be connected with a location tracking system (Location ID) 120, which can include one or more location-based detection systems such as a global positioning system (GPS) location system, a Wi-Fi location system, an infra-red (IR) location system, a Bluetooth beacon system, etc. In various implementations, the location tracking system 120 can include an orientation tracking system for tracking the orientation of the speaker system 20 in the environment. In certain cases, the location tracking system 120 includes a microelectromechanical system (MEMS) device that combines a multi-axis accelerometer, gyroscope, and/or magnetometer (sometimes referred to as an IMU or inertial measurement unit). However, additional or alternative sensors may form part of the position tracking system 120, e.g., in the case of a wearable speaker system, separate head-tracking or body-tracking systems (e.g., an optical-based tracking system, accelerometer, magnetometer, gyroscope or radar) for detecting a direction in which the user is facing, as well as movement of the user and the speaker system 20. The location tracking system 120 can be configured to detect changes in the physical location of the speaker system 20 and provide updated sensor data to the control system 60 in order to indicate a change in the location of the speaker system 20. Location tracking system 120 can also be configured to detect the orientation of the speaker system 20, e.g., a direction of the speaker system 20, or a change in the orientation of speaker system 20 such as a turning of a certain number of degrees. In these examples, the IMU may be particularly useful in detecting changes in orientation. However, it is understood that the location tracking system 120 could also include one or more optical or visual detection systems located at the speaker system 20 or another connected device configured to detect the orientation of the speaker system 20.

In particular example implementations, the location tracking system 120 can utilize one or more location systems and/or orientation systems to determine the location and/or orientation of the speaker system 20, e.g., relying upon a GPS location system for general location information and an IR location system for more precise location information, while utilizing an orientation tracking system such as the IMU to detect a direction of the speaker system 20 (e.g., a direction in which transducer(s) 80 are oriented). In any case, the location tracking system 120 can provide sensor data to the control system 60 about the location and/or orientation of the speaker system 20. In some cases, where location tracking system 120 includes an IMU, which can include an accelerometer/gyroscope/magnetometer, that IMU can include distinct accelerometer components gyroscope components and/or magnetometer components, or could be collectively housed in a single sensor component.

In some cases, speaker system 20 can further include a camera system 130 connected with control system 60 configured to detect a visual characteristic (e.g., a presence, location, proximity, identity and/or gesture) of the environment 10 and/or of one or more users 50. In some cases, camera system 130 is located at speaker system 20, and is configured to detect visual characteristics (e.g., gestures or identity) of user(s) 50 and/or of the environment 10 (e.g., presences of walls or large objects), e.g., across a room or a space. In any case, camera system 130 can be configured to detect a visual characteristic (e.g., presence, location, proximity, identity and/or gesture) of one or more objects or user 50 in environment 10. In various implementations, camera system 130 can be actively enabled, e.g., via user prompt, to track visual characteristics of one or more user(s) 50, or can be enabled during one or more mapping periods. In one particular implementation, camera system 130 can include a visual characteristic (VC) tracking engine 140 for processing image data captured at camera system 130. The visual characteristic (e.g., visual characteristic of user 50 or environment 10) can include one or more of a presence of a user 50, a proximity of a user 50 to one or more other reference items (e.g., speaker system 20 or other user(s) 50), a location of one or more user(s) 50 or an identity of a user 50. In some of these cases, the VC tracking engine 140 can be configured to detect the identity of a user 50, using image data from camera system 130 (e.g., either periodically or continuously obtained image data), and indicate the location of the identified user 50. In these example implementations, VC tracking engine 140 can visually identify the user 50 as the user 50 moves through an environment, and send an indication of that location to control system 60 in order to dynamically update the map of environment 10. In other cases, the VC tracking engine 140 can identify particular objects within environment 10 as having acoustically significant properties (e.g., via visual identification) and provide visual characteristic data to control system 60 for use in acoustically mapping environment 10.

Control system 60 can be connected with a digital signal processor (DSP) 150 for modifying the focus direction of the microphone array 30 according to various implementations described herein. That is, DSP 150 can be configured to modify the focus direction (Direction A, Direction B, etc.) of the microphone array 30 in the direction toward a user 50, or in a direction (Direction B, Direction C, etc.) away from a known noise source based upon the acoustic map 100.

As noted herein, microphone array 30 can include a plurality of microphones 40, which may each include a conventional receiver for receiving audio signals (e.g., acoustic signals such as acoustic input). In some cases, microphones 40 can include one or more directional microphones. However, in other cases, each microphone 40 in the array 30 can include an omnidirectional microphone configured to be directed by the DSP 150. DSP 150 can be coupled with microphones 40 (and mapping engine 90) and include one or more DSP filters 160 for processing acoustic input and/or acoustic output in order to control the direction of the array 30, e.g., by DSP beamforming. DSP beamforming is a known technique for summing the input (e.g., acoustic input) from multiple directions to achieve a narrower response to input(s) from a particular direction (e.g., Direction A, Direction B, etc.). FIG. 1 illustrates an example curved microphone array 30 including a plurality of microphones 40 arranged along an arcuate path, each having an x and y coordinate value.

Figure 2:
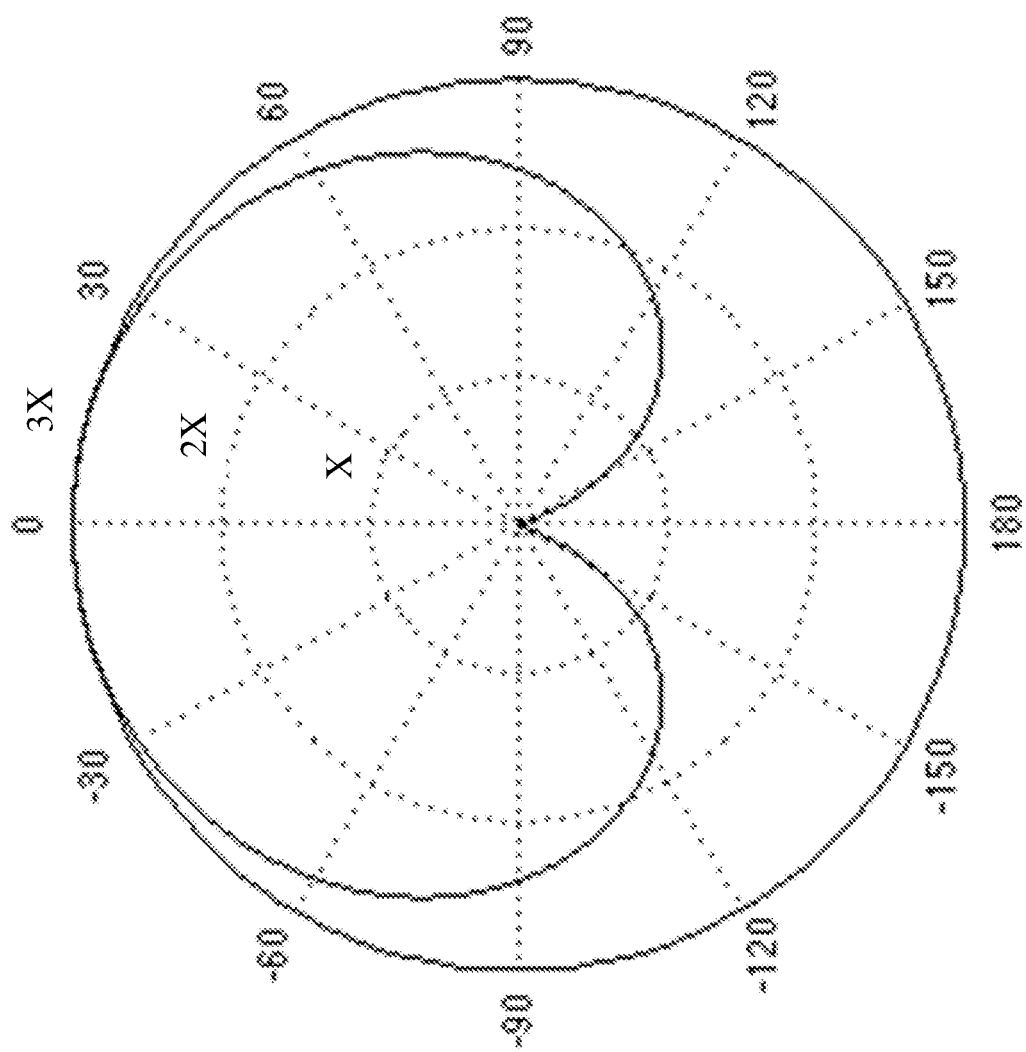
FIG. 2 is an example polar plot illustrating aspects of microphone array control.
Figure 3:
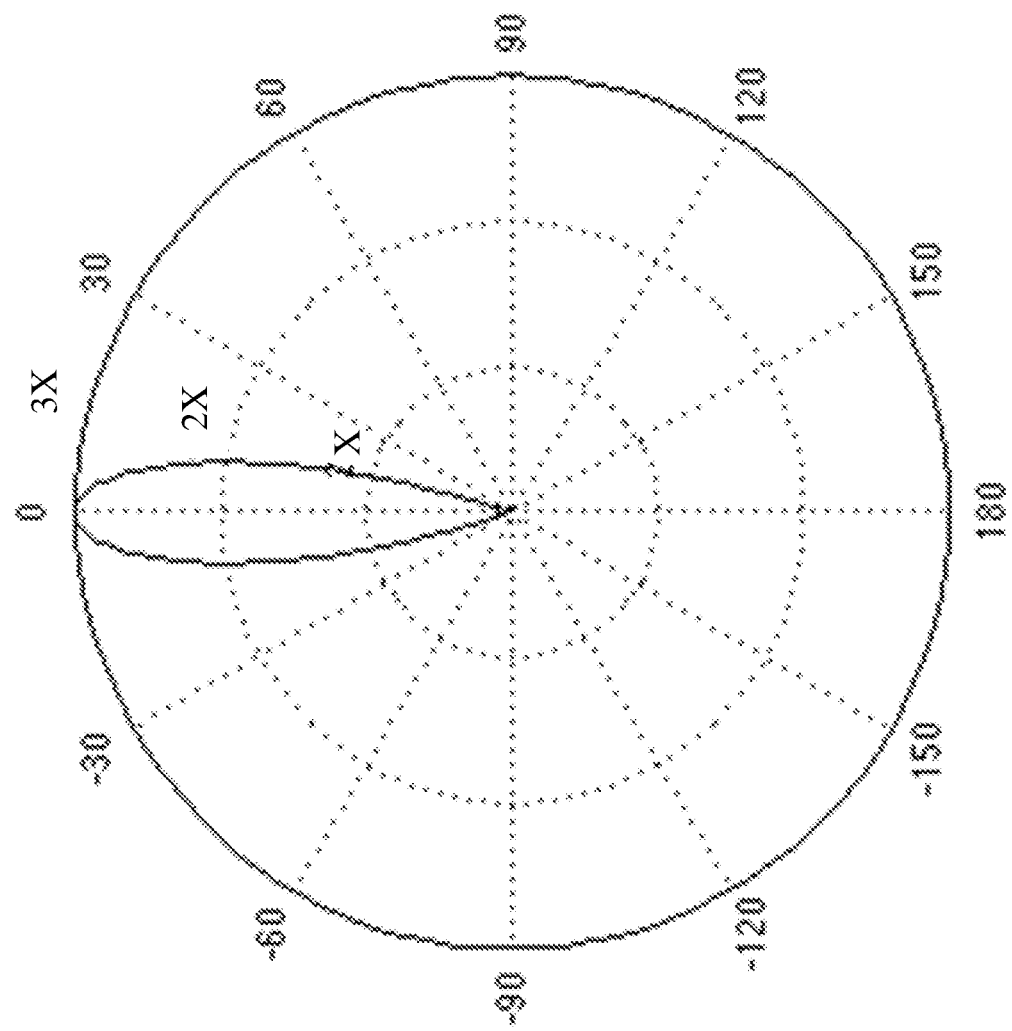
FIG. 3 is an example polar plot illustrating a control process for modifying the polar plot of FIG. 2.

An example response from a given environment (without beamforming) at microphones 40 is shown in the polar graphical depiction of FIG. 2, where the desired pointing direction (e.g., Direction A, Direction B, etc., FIG. 1) is called the maximum response angle (MRA), the angle in the polar graph of FIG. 2 is the off-set from that MRA, and the radius is the amplitude response in that MRA direction. FIG. 3 illustrates a filtered response at microphones 40 with DSP filters 160 applied to direct the microphone array 30 in a particular direction (e.g., the MRA direction, which can be dictated acoustic map 100).

Returning to FIG. 1, control system 60 is programmed to control microphone array 30 according to various approaches, as noted herein. In particular implementations, control system 60 (with mapping engine 90) is configured to: i) generate an acoustic map 100 including an acoustic description of the (physical) environment 10 proximate the speaker system 20; and ii) focus the microphone array 30 in one or more directions (e.g., Direction A, Direction B, Direction C) based upon the acoustic map 100 prior to receiving a voice command input 170 at the microphone array 30. As described herein, the acoustic map 100 can be generated with acoustic data gathered from either transmitting an acoustic output from transducers (and measuring acoustic response) and/or from acoustic input (e.g., voice command input) received at microphone array 30. In certain cases, only one of these inputs is necessary to generate the acoustic map 100. As noted herein, the control system 60 uses the acoustic map 100 to control the microphone array 30 prior to receiving a voice command input 170 at the microphone array.

That is, speaker system 20 can permit focusing of microphone array 30 without the need for a voice command input 170 at microphone array 30 regarding one or more focus directions. This pre-focusing process can allow for improved signal quality in commands, transmissions, etc. from the desired direction(s) (e.g., Direction A, Direction B, Direction C), as the microphone array 30 is already pre-positioned to focus on at least one direction based upon the acoustic map 100. It is understood that in various implementations, the term "voice command input" can refer to any voice command from a user 50, including a human or other system user. While control system 60 is capable of refining and updating the acoustic map 100 using the voice command input 170, the control system 60 is configured to pre-focus the microphone array 30 in a direction prior to receiving that voice command input 170.

In particular implementations, the control system 60 (including mapping engine 90) is configured to generate the acoustic map 100 over one or more mapping periods. For example, the control system 60 (including mapping engine 90) is configured to generate the acoustic map 100 over an initial mapping period, an advanced mapping period and a continuing mapping period. While the terms "initial", "advanced" and "continuing" may suggest that one or more periods of mapping act as pre-requisites for other periods, this may not necessarily be true. For example, the "advanced" and/or "continuing" mapping processes can be performed without requiring the "initial" mapping process be performed (or where the initial mapping functions are performed by another entity). In some cases, the speaker system 20 can be configured to perform only the functions of the advanced mapping period, or only the functions of the advanced mapping period and the continuing mapping period. The flow diagram in FIG. 4 is merely one example of a multi-period mapping process, and should not be considered limiting of the mapping functions described herein.

Figure 4:
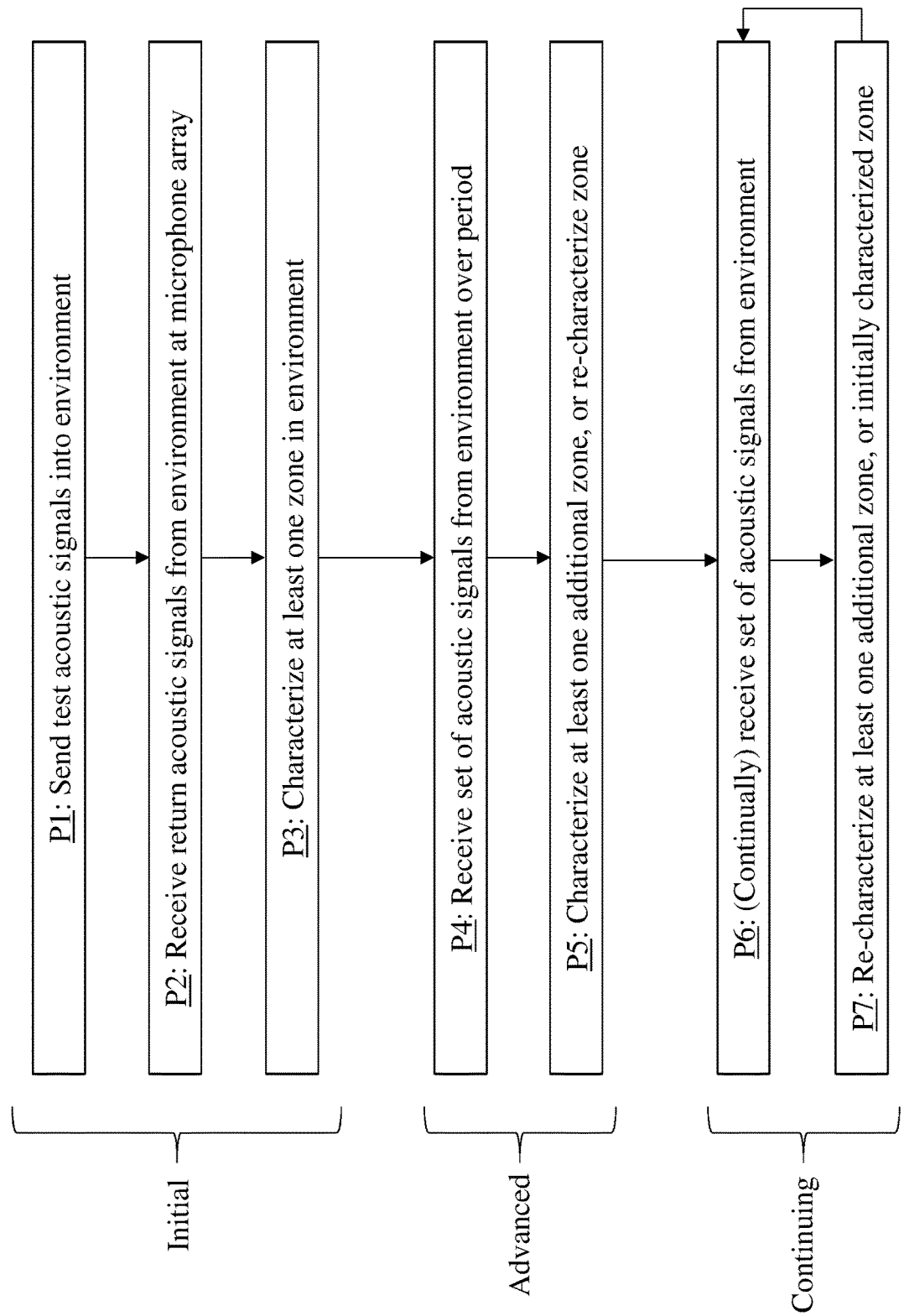
FIG. 4 is a flow diagram illustrating processes in mapping an acoustic environment according to various implementations.

FIG. 4 is a flow diagram illustrating processes in a method of acoustically mapping the environment 10. As shown, the initial mapping period can include the following processes:

Process P1: sending a set of test acoustic signals into the physical environment 10 from the transducer 80. This can include transmitting acoustic signals, via transducer 80, into the environment 10 at one or more frequency ranges, power levels, etc. In particular implementations, the transducer 80 sends full-range test signals into the environment 10 (e.g., at the full range of frequency and/or power level the transducer 80 can produce);

Process P2: receiving a set of return acoustic signals from the physical environment 10 at the microphone array 30. In various implementations, the return acoustic signals are received over a specified period (e.g., minutes, hours, days or weeks), and are used to periodically (or continuously) update the acoustic map 100. The data from return acoustic signals can be stored via any storage device described herein, and can be used to maintain and/or update the acoustic map 100; and Process P3: characterizing at least one zone (e.g., zones A, B, C, etc., FIG. 1) in the physical environment 10 based upon a difference between the set of test acoustic signals and the set of return acoustic signals. In various implementations, this process can include cataloging our otherwise attributing acoustic characteristics to one or more zones in physical environment 10. It is understood that the examples of zone A, zone B and zone C are illustrative of the many zones that can be characterized in any of the mapping periods described herein. A greater, or fewer, number of zones can be characterized using the mapping processes described according to various implementations.

Characterizing zones (e.g., zones A, B, C, etc.) in the physical environment 10 can include analyzing the acoustic properties of the physical environment 10 as detected by the difference between the transmitted test acoustic signals (process P1) and the return acoustic signals (process P2). These acoustic properties can include, for example, various spectral, temporal, or spectro-temporal statistics, including, for example, overall sound pressure level (SPL), variation in sound pressure level over time, sound pressure level in a number of frequency bands, variation of level in each band over time, the estimated signal-to-noise ratio, the frequency spectrum, the amplitude modulation spectrum, cross-frequency envelope correlations, cross-modulation-frequency envelope correlations, outputs of an auditory model, speech transmission index (STI), and/or mel-frequency cepstral coefficients. The acoustic properties can also include information identifying a presence of one or more acoustic sources of interest (e.g., human speakers), or acoustic sources of a predetermined type. Acoustic sources of a predetermined type can include noise sources (and associated signatures) such as an appliance (e.g., air conditioner or refrigerator), road noise detected via an open window and/or background music from another audio source.

In various implementations, the mapping engine 90 can utilize additional parameters in generating the acoustic map 100 of environments. Several additional parameters are disclosed in U.S. patent application Ser. No. 14/841,166 (US Patent Application Publication Number 2017/0060880), which is hereby incorporated by reference in its entirety.

At any time after the initial mapping period, or at another time altogether, an advanced mapping period can be initiated, e.g., according to a prescribed schedule, or after a designated waiting period. In particular implementations, the advanced mapping period can be initiated after the at least one zone in the physical environment 10 is characterized in the initial mapping period. The advanced mapping period is shown in additional processes, including:

Process P4: receiving a set of acoustic signals from the physical environment 10 at the microphone array 30 over a period. In some cases, this period can be designated according to system settings (e.g., according to factory settings or user-defined settings for speaker system 20). In some examples, this period can last approximately several days to approximately several weeks. The length of this period can also be dictated by an amount of available data (acoustic signals) received at the microphone array 30. For example, this advanced mapping period can be configured to conclude after a threshold amount of acoustic data is gathered from environment 10.

Process P5: characterizing at least one additional zone (e.g., additional zone(s) such as a zone D, E, F, etc., not shown in FIG. 1) in the physical environment 10 or re-characterizing the already characterized zone(s) (such as zones A, B, C, FIG. 1) in the physical environment 10, based upon the set of acoustic signals received over the period.

At any time after the advanced mapping period (or at another time altogether), a continuing mapping period can be initiated, e.g., according to a prescribed schedule, or after a designated waiting period. In particular implementations, the continuing mapping period can be initiated after one of the initial zones (e.g., zones A, B, C) in the physical environment 10 is re-characterized or after an additional zone (e.g., zone D, E, F, etc.) is characterized in the advanced mapping period. The continuing mapping period is shown in additional processes, including:

Process P6: continually receiving a set of acoustic signals from the physical environment 10 at the microphone array 30; and Process P7: re-characterizing the at least one additional zone (e.g., zone D, E, F, etc.) or the initially characterized zone (e.g., zone A, B, C) in the physical environment 10 based upon the set of acoustic signals continually received during the continuing mapping period.

The processes of characterizing and re-characterizing zones in the physical environment 10 can be performed iteratively (and continuously, in some cases) to generate and update an acoustic map 100 (shown as loop in FIG. 4). In some implementations, the collected acoustic signals can be preprocessed by the mapping engine 90 in order to improve the efficiency of each subsequent mapping operation. For example, the complete set of acoustic features in the acoustic signals can be subjected to a dimension reduction process (e.g., a principal components analysis (PCA), or independent component analysis (ICA)) to represent the environment 10 using a smaller number of independent features. In some implementations, the same dimension reduction process can be repeated for the location identification information and visual characteristic data gathered by other components in speaker system 20. Dimension reduction refers to machine learning or statistical techniques in which a number of datasets, each specified in high-dimensional space, is transformed to a space of fewer dimensions. The transformation can be linear or nonlinear, and can include, for example, principal components analysis, factor analysis, multidimensional scaling, artificial neural networks (with fewer output than input nodes), self-organizing maps, and k-means cluster analysis.

Returning to FIG. 1, in particular implementations, the control system 60 can perform additional processes in generating the acoustic map 100. For example, as noted herein, the control system 60 can receive a set of acoustic signals from the physical environment 10 at the microphone array 30. The control system 60 can further identify at least one noise source from the set of received acoustic signals. Example noise sources could include a vacuum cleaner, a heating/ventilating/air-conditioning (HVAC) unit, a food processor, etc. The control system 60 can compare the received set of acoustic signals with stored noise signatures 180 in a connected library 190 in order to identify a match indicating that the acoustic signals belong to a noise source. In response to identifying the noise source, the control system 60 can create a microphone array filter 200 that is configured to at least partially reject the noise source(s). After creation of the microphone array filter(s) 200, the control system 60 can store the microphone array filter(s) 200 in library 190 and/or in the DSP 150.

In particular implementations, creating the set of microphone array filters 200 includes categorizing the set of received acoustic signals according to at least one of frequency or amplitude, and correlating control instructions for modifying a gain on the microphone array 30 with the categorized set of received acoustic signals. For example, the microphone array filters 200 can include frequency-dependent filters selected to knock out (interfere with) frequencies along a particular spectrum for one or more noise sources.

It is understood that library 190 could be a local library in a common geographic location as one or more portions of control system 60, or may be a remote library stored at least partially in a distinct location or in a cloud-based server. Library 190 can include a conventional storage device such as a memory, or can include a distributed and/or cloud-based storage device as described herein. It is further understood that library 190 could include a plurality of microphone array filters 200 for a plurality of noise sources from distinct users, profiles and/or environments. In this sense, library 190 could store microphone array filters 200 which are applicable to specific users 50, profiles or environments, but may also store microphone array filters 200 that can be used by distinct users 50, profiles or at other environments, e.g., where a noise source is common to multiple users 50, profiles and/or environments.

In various implementations, library 190 can include a relational database including relationships between the microphone array filter(s) 200 and the acoustic signals from the identified noise source sample(s). In some cases, library 190 could also include a text index for noise sources, e.g., with pre-set or user-definable categories. This could allow the user (e.g., in response to a prompt) to provide information about the type of noise source, such as by selecting a type of the source from a menu (e.g., provided in a user interface or at control system 60). Control system 60 can further include a learning engine (e.g., a machine learning/ artificial intelligence component such as an artificial neural network) configured to learn about the type of source selected, e.g., from a group of users' noise sources (e.g., washing machines or vacuum cleaners).

In additional implementations, in response to detecting acoustic signals from the identified noise source, the speaker system 20 is configured to modify the direction of the microphone array 30 according to the stored microphone filter 200. In particular implementations, the control system 60 (via DSP 150) is configured to apply the microphone array filter 200 while either receiving the voice command input 170 from user 50 at the microphone array 30, or while transmitting an acoustic output signal at the transducer 80. In more specific implementations, the microphone array filter 200 is applied while receiving the voice command input 170 from user at microphone array 30 in order to enhance the clarity of the received voice command input 170. In practice, applying the microphone array filter 200 can include: receiving an acoustic noise signal at the microphone array 30; comparing the acoustic noise signal with the acoustic signals from the identified at least one noise source in the library 190 of microphone array filters 200; and modifying a gain on the microphone array 30 in response to the acoustic noise signal matching the acoustic signals from the identified at least one noise source. In various particular implementations, the microphone gain is modified even when the user 50 is not providing a voice command input 170. That is, the gain on microphone array 30 can be modified to enhance wake word (or phrase) recognition, such that the speaker system 20 applies microphone array filters 200 according to the acoustic map 100 prior to receiving a voice command input 170 from user 50.

As noted herein, the DSP 150 can be configured to compare the audio noise signal with the noise source samples stored in the library 190, and modify the gain on the microphone array 30 in response to the audio noise signal matching at least one of those noise source samples. In particular, control system 60 can utilize DSP 150 to modify a gain and a direction of the microphone array 30 in order to knock out (interfere with) the noise from noise source(s).

In additional implementations, the acoustic map 100 can account for locations of noise sources in the physical environment 10, as well as frequent voice-command locations in the physical environment 10. That is, similarly to identifying noise sources within environment 10, speaker system 20 is further configured to detect a location of those noise sources and/or frequent voice-command locations (e.g., locations from which user(s) 50 provide voice commands). Control system (with DSP 150) can create additional microphone array filters 200 configured to at least partially reject the noise source in its identified location, and/or enhance detection of the voice command input from that frequent voice-command location. As noted herein, these additional microphone array filters 200 can be applied, e.g., for wake word (or phrase) detection prior to receiving a voice command input 170 from user 50. In some example implementations, the frequent voice-command location can include one or more seats within a room (e.g., on a couch or chair), or a common area for users to gather (e.g., around a kitchen island). These frequent voice-command locations can be located within a same or neighboring zone as a noise source (e.g., a television or a dishwasher). The microphone array filters 200 can be configured to modify the gain on one or more microphones 40 in the array 30 in order to enhance acoustic reception from the frequent voice command location, while diminishing acoustic reception from the noise source location.

In particular implementations, the control system 60 can enhance one or more mapping periods by permitting user(s) 50 to enter identification (ID) information 210 about speaker system 20 (e.g., via a user interface 220 or via a software application such as a downloadable application accessible on a connected smart device). For example, the control system 60 can be configured to receive user-entered identification information 210 about the speaker system 20, and update the acoustic map 100 of the environment 10 based upon that user-entered identification information 210. In some particular examples, the user-entered identification information 210 can include a name, nickname, or location name of the speaker system 20. In these cases, the control system 60 can prompt user 50 to enter identification information 210 when connecting the speaker system 20, e.g., to a wireless network or a power source, or to a linked account such as a cloud-based account or streaming content account. The identification information 210 can be used to determine a location or likely location of the speaker system 20 in an environment. For example, when a user 50 identifies speaker system as "kitchen," control system 60 can be configured to apply stored microphone array filters 200 for modifying the gain on microphones 40 according to noise sources typically found in a kitchen (e.g., dishwasher, blender or microwave). Additionally, control system 60 can be configured to perform mapping processes described herein with a weighting toward noise sources that are typically found in a kitchen. In some examples, control system 60 includes a rules-based engine for determining particular microphone array filters 200 to apply based upon identification information 210, e.g., based upon the name of the user 50, a noise profile, or another input from the user 50. In particular examples, identification information 210 about the speaker system 20 can include a name such as "office," "backyard," or "gym," and can allow control system 60 to pre-select likely filters for application, e.g., for a telephone, wind, or exercise equipment.

In additional implementations, control system 60 is further configured to prompt the user(s) 50 for a voice feedback input (e.g., similar to voice command 170) about the acoustic map 100. In these cases, the prompt can include an audio prompt, provided via transducers 80 and/or a visual, tactile or other prompt provided at speaker system 20 or another connected device (e.g., smart device). The audio prompt can request feedback from the user 50 about characteristics of the acoustic map 100. In some cases, the audio prompt can ask the user to provide voice feedback from one or more locations in the environment 10, such as, "stand or sit in locations where you typically spend time in this room and . . . repeat your favorite phrase (or, sing your favorite song, or provide other voice commands)." The control system 60 can receive the voice feedback input from the user 50 (e.g., at microphone array 30), and update the acoustic map 100 based upon that voice feedback input. In some cases, control system 60 is configured to utilize both the content of the voice feedback input (e.g., "Yes" or "No" answers) as well as the quality of that voice feedback input (e.g., the presence of one or more noise sources or acoustic interference) in order to update the acoustic map 100 of the environment 10. In some additional implementations, the control system 60 can iteratively request voice feedback and process those voice feedback inputs to further refine the acoustic map 100 over a given period.

In still other cases, speaker system 20 is configured to interact with user 50 in order to sample noise sources and create customized microphone array filters 200 for subsequently neutralizing those types of noise. The speaker system 20 can provide a prompt to the user 50 or other system control (e.g., control system for connected devices such as appliances or entertainment devices) in order to sample noise sources (e.g., common noise sources in a home, office or other environment), and can create and store specific microphone array filters 200 in the acoustic map 100 for those noises for later implementation. It is understood that the term "user prompt" may not require a human user to initiate the noise sampling process. For example, in some cases, the "user" may be a robotic user, an artificial intelligence (AI) system or a control system configured to initiate the noise source in response to a prompt. In any case, the speaker system 20 can be configured to enhance audio signal quality at the microphone array 30 by filtering specific noise signals.

In additional implementations, as described herein, the speaker system 200 can include a portable speaker system such as a portable smart speaker or a personal audio device. In these cases, the speaker system 20 (e.g., using location tracking system 120) is configured to detect movement of the speaker system 20 from a first physical location to a second physical location. In some cases, the location tracking system 120 is configured to detect movement of the speaker system 20 from the first physical location to the second physical location by detecting movement of the speaker system 20 over a period by greater than a movement threshold. For example, the movement threshold can be designated as a sufficient amount of movement (e.g., translation of a threshold distance, elevation change of a threshold distance, rotation of a threshold angle) to modify the acoustic characteristics of the speaker system 20. This threshold can be correlated with a movement period (e.g., greater than several seconds or several minutes) in order to avoid re-mapping the environment surrounding speaker system 20 when that speaker system 20 is being moved only for temporary purposes (e.g., cleaning, charging, etc.). In some cases, the movement threshold is measured by a change in at least one of: a location of a power source for the speaker system 20 (e.g., a change in the source of power from a first power source location to a second power source location), an orientation of the speaker system (e.g., a rotation or tilt of a certain number of degrees), a position of the speaker system (e.g., a translation or elevation change of a certain quantity), a proximity to at least one communication network (e.g., a proximity to a WiFi access point or other communications hub), or a proximity to at least one other connected electronic device (e.g., a Bluetooth or WiFi connected device).

In response to detecting movement of the speaker system 20 from the first physical location to the second physical location, the control system 60 can generate an updated acoustic map 100 including an acoustic description of a physical environment proximate the speaker system 20 at the second physical location. This process can be performed in a similar manner as generating the initial acoustic map 100 for the first physical location. As with generating the initial acoustic map 100 for the speaker system 20 in the first physical location, after generating the updated acoustic map 100, the control system 20 can focus the microphone array in an updated direction based upon the updated acoustic map 100 prior to receiving a subsequent voice command input 170 at the microphone array 30. That is, the control system 20 can be configured to repeat the mapping processes (Processes P1-P6) for the second physical location in order to update the acoustic map 100 and focus the microphone array 30 based upon that updated map.

In some particular implementations, where the speaker system 20 is moved to another location, control system 60 is configured to keep the microphone array 30 focused in the original focus direction based upon the acoustic map 100 while the updated acoustic map is being generated. In these example implementations, the location tracking system 120 is configured to determine an orientation of the speaker system 20, and the control system 60 is configured to use this orientation information, along with data from the acoustic map 100, to maintain the original (relative) focus direction of microphone array 30 while the updated acoustic mapping process is being performed.

In particular implementations, the location tracking system 120 can determine whether speaker system 20 has moved beyond environment 10, such that one or more characteristics of the acoustic map 100 are applicable (or not applicable) to the updated location. In some cases, where location tracking system 120 determines that speaker system 20 has not moved beyond the environment 10, the control system 60 can utilize one or more portions of the acoustic map 100 to focus the microphone array 30 at the updated location.

Additional implementations of the speaker system 20 can utilize data inputs from external devices 230, including, e.g., one or more personal audio devices, smart devices (e.g., smart wearable devices, smart phones), network connected devices (e.g., smart appliances) or other non-human users (e.g., virtual personal assistants, robotic assistant devices). External devices 230 can be equipped with various data gathering mechanisms providing additional information to control system 60 about the acoustic map 100 of environment 10. For example, external devices 230 can provide data about the location of one or more users 50 in environment 10, the location of one or more acoustically significant objects in environment (e.g., a couch, desk or wall), or high versus low trafficked locations. Additionally, external devices 230 can provide identification information about one or more noise sources, such as image data about the make or model of a particular television, dishwasher or espresso maker. Examples of external devices 230 such as beacons or other smart devices are described in U.S. patent application Ser. No. 15/687,961, which is hereby incorporated by reference in its entirety.

Figure 5:
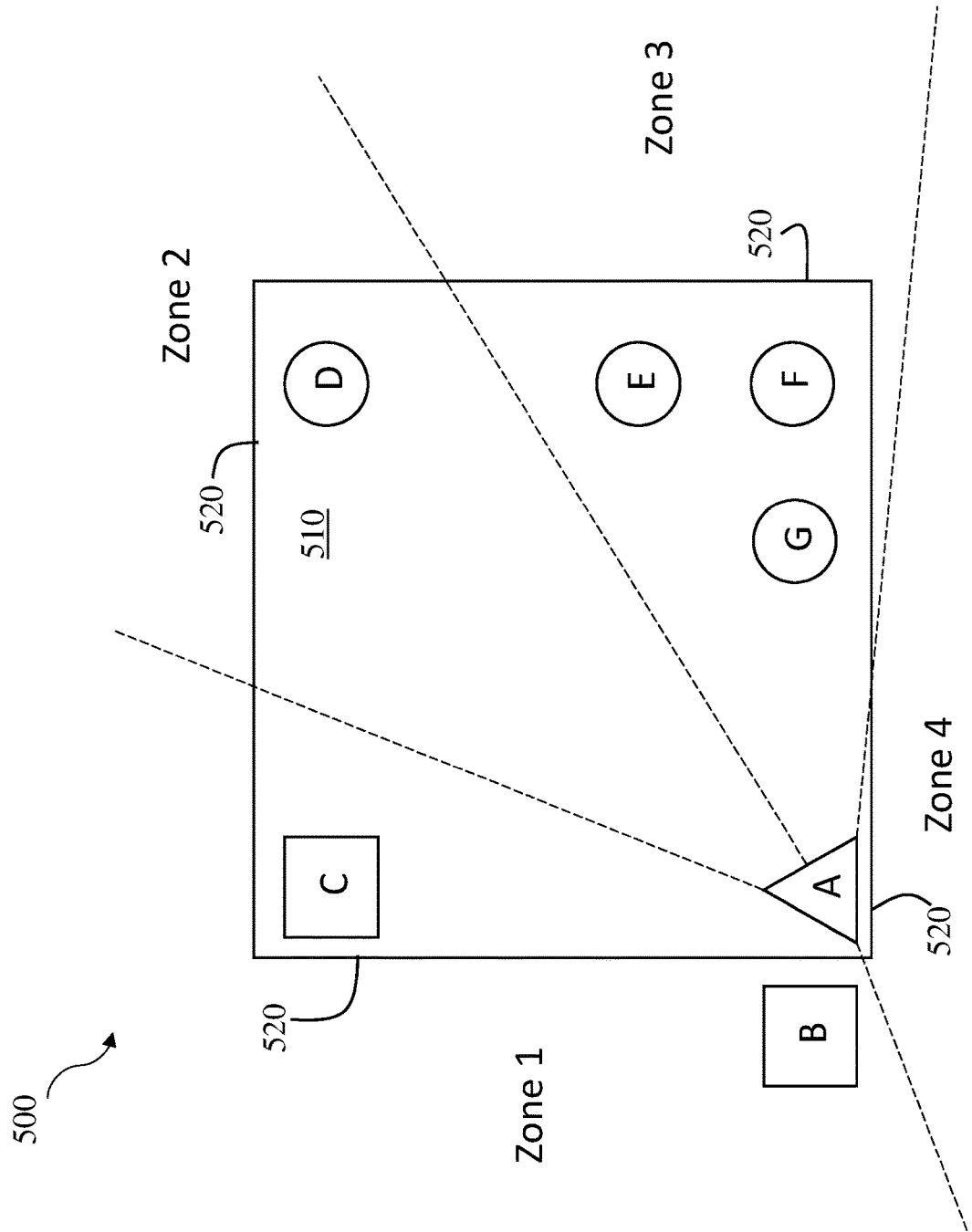
FIG. 5 shows a schematic depiction of an example acoustic map, utilized according to various implementations.

FIG. 5 shows a schematic depiction of an example acoustic map 500, formed according to various implementations. As shown, the acoustic map 500 depicts a top view of a room 510 defined by four walls 520. Component A is a speaker system such as speaker system 20 (FIG. 1). Component B is a noise source within or behind one of the walls 520. Component C is a noise source in the room 510. Locations D, E, F and G indicate locations from which a user (e.g., user 50, FIG. 1) has previously engaged the speaker system's voice interface, as recognized by the speaker system (A).

Zone 1 is a direction (relative to speaker system (A)) where noise sources (e.g., noise source (B)) are dominant, and a direction from which the speaker system (A) may reduce a gain from the microphone array (e.g., microphone array 30, FIG. 1). Zone 2 is a direction, relative to speaker system (A), where user commands sometimes originate, and the speaker system (A) may use a default gain or increased gain from the microphone array in order to maintain or improve the accuracy of voice commands in that zone. Zone 3 is a direction, relative to speaker system (A), where user commands frequently originate, and the speaker system (A) may use the default gain or increased gain from the microphone array in order to maintain or improve the accuracy of voice commands in that zone. In some cases, where Zone 3 is a direction with a higher detected frequency of voice commands (e.g., when compared with Zone 2), the increased gain for Zone 3 can be higher than the increased gain for Zone 2. This gain differential can be set according to prescribed thresholds, such as frequency of voice commands from a particular zone and/or the decibel level of voice commands received from a particular zone. In the example of acoustic map 500 in FIG. 5, these frequencies can be differentiated by a number of locations in a zone (e.g., three locations E, F, G in Zone 3 versus one location D in Zone 2), or by a size of a particular location in a zone (e.g., where frequency is depicted as a size differential in each of the displayed or otherwise indicated locations). Zone 4 is a direction, relative to speaker system (A), without any known noise sources or user interactions (e.g., in the direction of a wall 520 without a noise source). In Zone 4, the speaker system (A) may use the default gain, or a reduced gain on the microphone array 30 (FIG. 1). This example acoustic map 500 is intended to illustrate just a few of the general rules which the speaker system (e.g., speaker system 20, FIG. 1) can apply to control a microphone array (e.g., microphone array 30, FIG. 1). It is understood that various additional control rules can be applied by the speaker system, as described according to the implementations herein.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A computer-implemented method of controlling a microphone array in a speaker system, the method comprising:
    generating an acoustic map comprising an acoustic description of a physical environment proximate the speaker system;
    focusing the microphone array in a direction based upon the acoustic map prior to receiving a voice command input at the microphone array,
    wherein generating the acoustic map comprises:
        detecting a location of at least one noise source in the physical environment; and
        creating a microphone array filter configured to at least partially reject the at least one noise source;
    receiving voice feedback input from a user at the microphone array; and
    updating the acoustic map of the physical environment based upon the received voice feedback input.

2. The computer-implemented method of claim 1, further comprising prompting a user for voice feedback input about the acoustic map.

3. The computer-implemented method of claim 1, wherein generating the acoustic map comprises an initial mapping period, an advanced mapping period, and a continuing mapping period,
    wherein the initial mapping period comprises:
        sending a set of test acoustic signals into the physical environment from a transducer in the speaker system;
        receiving a set of return acoustic signals from the physical environment at the microphone array; and
        characterizing at least one zone in the physical environment based upon a difference between the set of test acoustic signals and the set of return acoustic signals.

4. The computer-implemented method of claim 3, wherein the advanced mapping period comprises:
    receiving a set of acoustic signals from the physical environment at the microphone array over a period; and
    characterizing at least one additional zone in the physical environment or re-characterizing the at least one zone in the physical environment, based upon the set of acoustic signals received over the period.

5. The computer-implemented method of claim 4, wherein the continuing mapping period comprises:
    continually receiving a set of acoustic signals from the physical environment at the microphone array; and
    re-characterizing the at least one additional zone or the at least one zone in the physical environment based upon the set of acoustic signals continually received during the continuing mapping period.

6. The computer-implemented method of claim 1, further comprising:
    receiving user-entered identification information about the speaker system; and
    updating the acoustic map of the physical environment based upon the user-entered identification information.

7. The computer-implemented method of claim 1, wherein the speaker system comprises a portable speaker system, and wherein the method further comprises:
    detecting movement of the speaker system from a first physical location to a second physical location;
    generating an updated acoustic map comprising an acoustic description of a physical environment proximate the speaker system at the second physical location; and
    focusing the microphone array in an updated direction based upon the updated acoustic map prior to receiving a subsequent voice command input at the microphone array.

8. The computer-implemented method of claim 7, wherein the microphone array remains focused in the direction based upon the acoustic map while the updated acoustic map is being generated.

9. The computer-implemented method of claim 7, wherein detecting movement of the speaker system from the first physical location to the second physical location comprises detecting movement of the speaker system by detecting a change in at least one of: a location of a power source for the speaker system, an orientation of the speaker system, a position of the speaker system, a proximity to at least one communication network, or a proximity to at least one other connected electronic device.

10. A speaker system comprising:
    a microphone array; and
    a control system connected with the microphone array, the control system programmed to:
        generate an acoustic map comprising an acoustic description of a physical environment proximate the speaker system, wherein generating the acoustic map comprises:
            receiving a set of acoustic signals from the physical environment at the microphone array;
            identifying at least one noise source from the set of received acoustic signals;
            creating a microphone array filter configured to at least partially reject the at least one noise source, wherein creating the set of microphone array filters comprises categorizing the set of received acoustic signals according to at least one of frequency or amplitude, and correlating control instructions for modifying a gain on the microphone array with the categorized set of received acoustic signals; and
            storing the microphone array filter in a library of microphone array filters; and
        focus the microphone array in a direction based upon the acoustic map prior to receiving a voice command input at the microphone array.

11. The speaker system of claim 10, wherein generating the acoustic map comprises an initial mapping period, an advanced mapping period, and a continuing mapping period, wherein the speaker system further comprises a transducer connected with the control system,
    wherein the initial mapping period comprises:
        sending a set of test acoustic signals into the physical environment from the transducer;

receiving a set of return acoustic signals from the physical environment at the microphone array; and characterizing at least one zone in the physical environment based upon a difference between the set of test acoustic signals and the set of return acoustic signals, wherein the advanced mapping period comprises:

receiving a set of acoustic signals from the physical environment at the microphone array over a period; and characterizing at least one additional zone in the physical environment or re-characterizing the at least one zone in the physical environment, based upon the set of acoustic signals received over the period, and wherein the continuing mapping period comprises:

continually receiving a set of acoustic signals from the physical environment at the microphone array; and re-characterizing the at least one additional zone or the at least one zone in the physical environment based upon the set of acoustic signals continually received during the continuing mapping period.

12. The speaker system of claim 10, wherein generating the acoustic map comprises:

at least one of detecting a location of at least one noise source in the physical environment or detecting a frequent voice-command location in the physical environment; and creating a microphone array filter configured to at least partially reject the at least one noise source or enhance detection of the voice command input from the frequent voice-command location.

13. The speaker system of claim 10, wherein the control system is further configured to:

receive user-entered identification information about the speaker system; and update the acoustic map of the physical environment based upon the user-entered identification information.

14. The speaker system of claim 10, wherein the speaker system comprises a portable speaker system, and wherein the control system is further configured to:

detect movement of the speaker system from a first physical location to a second physical location;

generate an updated acoustic map comprising an acoustic description of a physical environment proximate the speaker system at the second physical location; and focus the microphone array in an updated direction based upon the updated acoustic map prior to receiving a subsequent voice command input at the microphone array, wherein the microphone array remains focused in the direction based upon the acoustic map while the updated acoustic map is being generated.

15. The speaker system of claim 14, wherein detecting movement of the speaker system from the first physical location to the second physical location comprises detecting movement of the speaker system by detecting a change in at least one of: a location of a power source for the speaker system, an orientation of the speaker system, a position of the speaker system, a proximity to at least one communication network, or a proximity to at least one other connected electronic device.

16. The speaker system of claim 10, wherein the control system is further configured to:

prompt a user for a voice feedback input about the acoustic map;

receive the voice feedback input from the user at the microphone array; and update the acoustic map of the physical environment based upon the received voice feedback input.

17. The speaker system of claim 10, further comprising a transducer connected with the control system, wherein the transducer and the microphone array are located in physically separate housings within the acoustic environment.

18. The speaker system of claim 10, wherein the library of microphone array filters comprises a relational database comprising relationships between the microphone array filter and the acoustic signals from the identified at least one noise source, wherein the control system is configured to apply the microphone array filter while receiving the voice command input at the microphone array, wherein applying the microphone array filter comprises:

receiving an acoustic noise signal at the microphone array;

comparing the acoustic noise signal with the acoustic signals from the identified at least one noise source in the library of microphone array filters; and modifying a gain on the microphone array in response to the acoustic noise signal matching the acoustic signals from the identified at least one noise source.

19. A computer-implemented method of controlling a microphone array in a portable speaker system, the method comprising:

generating an acoustic map comprising an acoustic description of a physical environment proximate the speaker system; and focusing the microphone array in a direction based upon the acoustic map prior to receiving a voice command input at the microphone array;

wherein generating the acoustic map comprises:

detecting a location of at least one noise source in the physical environment; and creating a microphone array filter configured to at least partially reject the at least one noise source;

detecting movement of the speaker system from a first physical location to a second physical location;

generating an updated acoustic map comprising an acoustic description of a physical environment proximate the speaker system at the second physical location; and focusing the microphone array in an updated direction based upon the updated acoustic map prior to receiving a subsequent voice command input at the microphone array.

20. The computer-implemented method of claim 19, wherein the microphone array remains focused in the direction based upon the acoustic map while the updated acoustic map is being generated.

* * * * *